July 27, 1937.  W. E. KING  2,088,418
HYDRAULIC SWIVEL
Filed Jan. 15, 1929
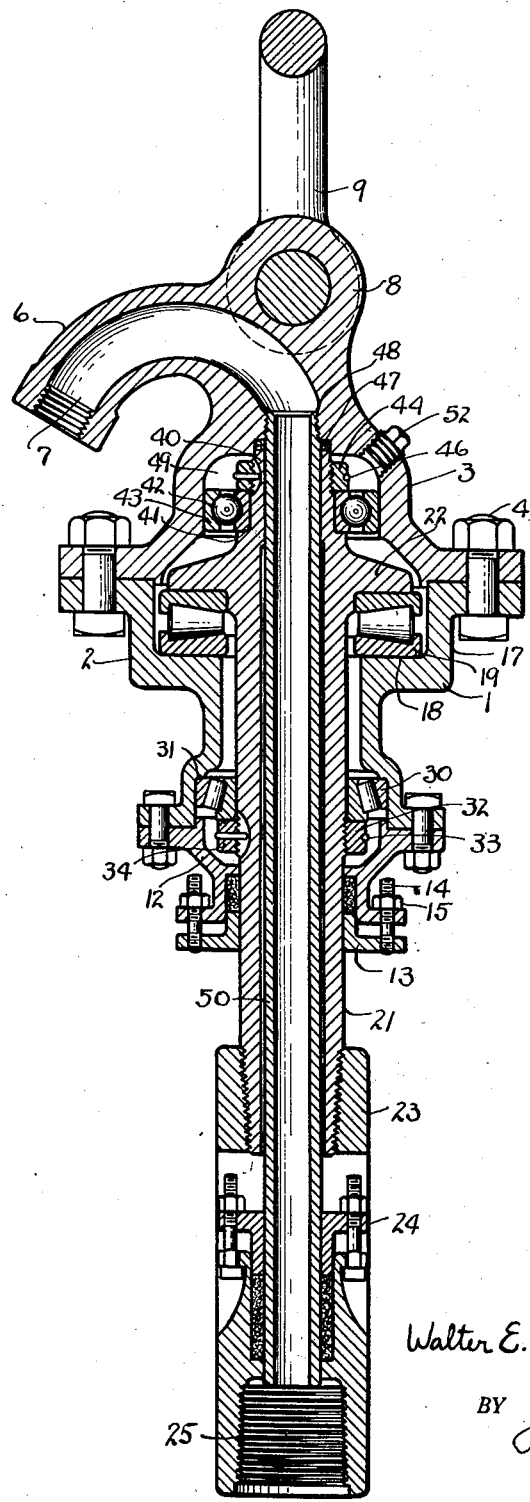
Walter E. King   INVENTOR.
BY Jesse R. Stone
ATTORNEYS.

Patented July 27, 1937

2,088,418

UNITED STATES PATENT OFFICE 2,088,418

HYDRAULIC SWIVEL

Walter E. King, Houston, Tex.

Application January 15, 1929, Serial No. 332,661

7 Claims. (Cl. 255—25)

My invention relates to improvements in the art of well drilling and particularly to an improvement in hydraulic swivels, such as are used in the rotary method of drilling wells.

Heretofore considerable difficulty has been encountered in providing a swivel which was capable of withstanding the enormous thrust and radial vibration which occurs at the head of the drill stem. The swivel is a device which is attached to the head of the drill stem and supports the entire load of the drill stem, the drill bit and the flushing fluid which is passing through the hollow drill stem. A connection is usually made with the swivel which does not rotate in order that the flushing fluid may be passed into the rotating drill stem. In order that the drill stem may be supported, and at the same time allowed to rotate, it is necessary to provide suitable thrust and radial bearings in the swivel. It is, therefore, one of the objects of my invention to improve upon the construction and arrangement of the bearings in the swivel so that they may more readily serve the purpose for which they are designed.

Another object of my invention is to provide an arrangement of bearings which will absorb the vertical thrust in either direction as well as the radial vibration from the drill stem.

Another object of my invention is to arrange a combination thrust and radial bearing in the swivel housing so that it will absorb any upward thrust before it may reach the main thrust bearing.

A still further object of my invention is to provide certain of the bearings with adjustable devices so that any back lash or end play in the bearings is entirely avoided.

I aim to provide adjustable bearings in such a manner that any variation in the main thrust bearing may be compensated for by adjustment from either above or below.

Other and further objects of my invention will be readily apparent to those skilled in the art to which my invention appertains when the following description is considered in connection with the accompanying drawing, wherein the single figure illustrates a vertical central sectional view through a swivel in which my improvements have been incorporated.

The cause of a great many of the troubles which have been encountered in the past with swivels of the type herein generally disclosed have been traced to the failure of one or more of the thrust radial bearings. The thrust bearing is very often caused to wear by misalignment of the head of the drill stem, due to the fact that insufficient or no radial bearing support has been provided. When radial vibration of the head of the drive stem is permitted, the swivel is caused to vibrate a considerable amount. This vibration causes stresses and distortion of the main thrust bearing at the time it is subjected to the enormous load of the drill stem and drilling fluid, so that considerable wear is caused on the thrust bearing in this manner. It must be kept in mind that the swivel is supported from the crown block of the derrick, which is usually 80 or 100 feet in height. When a new stand of drill pipe has been placed upon the drill stem the swivel is often suspended 20 or 30 feet above the derrick platform so that it is free to gyrate a considerable amount as the drill stem is rotated.

By having reference to the figure of the drawing I have indicated the swivel generally by means of the reference character 1. This swivel comprises a central casing or housing 2, which carries an upper cap member 3, which forms a part of the housing 2 and is attached thereto in any suitable manner such as by means of bolts 4. Said cap member carries the usual gooseneck 6 which has a passage 7 therein and is adapted to receive a flexible hose whereby flushing fluid is forced into the passage 7. This cap member 3 also has a suitable connection 8 for attachment of a bail or other supporting means 9, to which a C-link or traveling block hook is attached. It should be particularly noted that the bail is connected coaxially of the swivel so that the load thereon is transferred through the center of gravity of the swivel.

The housing 2 has attached thereto a base plate 12 which serves to close the lower end thereof. This base plate is attached in any suitable manner by means of flanges and in turn supports a stuffing box or gland 13. Said gland 13 has bolts 14 fastened therein and the nuts 15 which serve as a means of adjusting the gland 13 are preferably placed on the upper side so that they are not in a position to be broken off or encountered during operation of the device.

The casing or housing 2 has an enlarged portion 17, which has a shoulder 18 therein. This shoulder is of considerable width and is adapted to receive the main thrust bearing 19. Said thrust bearing may be of any suitable type which is adapted to support heavy loads, and I have shown a type of roller bearing which has been found satisfactory. This thrust bearing 19 carries the central stem or bearing spindle 21, which has formed thereon a head 22; which head is somewhat enlarged and is adapted to rest upon the upper side of the thrust bearing 19. The bearing spindle 21 extends down through the gland 13 and carries a connecting member 23, which has a gland 24 therein. This member 23 is internally threaded at its base at 25 to receive the upper end of the drive stem or tool joint carried thereby. The gland 24 is adjustable by means of nuts and bolts to prevent the escape of flushing fluid from the drill stem.

As previously described, this bearing spindle or casing 21 is rigidly affixed to the head of the drive stem by means of threads 25 and inasmuch as the drive stem may extend into a well several thousand feet in length its vibration during rotation is considerable. This vibration is transmitted to the bearing spindle 21 and unless it is suitably supported in both radial and axial directions there is necessarily considerable vibration to be taken care of by the thrust bearing 19. In order that a rigid structure be provided; and so that any vibration of the drill stem will be transmitted to the entire swivel; so that any movement will be taken care of by the pivoted bail 9, I have provided suitable radial bearings. One of these bearings, as shown at 30, is a combination radial and thrust bearing. This bearing, it will be noted, is placed below the main thrust bearing 19 and adjacent the lower end of the housing or cross head 2. In this manner a greater leverage with respect to the head 22 is obtained. The bearing 30 is shown as a roller bearing wherein the rollers are placed in a diagonal position in order that they may receive a longitudinal thrust as well as radial stresses. It seats against a shoulder 31 in the housing 2, but one of my improvements consists in an adjustable collar 32, which is threaded onto the bearing spindle 21. Said collar 32 may be rotated in order to securely clamp the bearing 30 against the shoulder 31. In this manner, as wear or end play occurs in the spindle 21 it may be immediately compensated for by adjustment of the collar 32. I have also shown a G-ring 33 by which the collar 32 is locked in any desired position as one end of the G-ring, as at 34, is adapted to seat in slight cavities formed in the bearing spindle 21.

In well drilling it is often necessary to raise the swivel, drill stem and drill bit for a short distance off the bottom of the well bore and then drop them sharply in order to remove gumbo and other sticky formations which are encountered and which have balled up the cutting face of the drill bit. This operation is known as spudding and subjects the swivel to one of its most severe tests, as instead of carrying a downward thrust by means of the cross head 22 on the main thrust bearing 19, the stresses are reversed and as the drill bit strikes the bottom an upward thrust is transmitted to the bearing spindle 21. If there is any play in the bearing 19 the head 22 is permitted to move slightly and may injure the swivel. By means of the combination axial and thrust bearing 30, I have provided a structure which will absorb this upward thrust and by adjustment of the collar 33 the thrust bearing 30 and the main thrust bearing 19 may at all times be kept in a proper condition to carry the thrust for which they are designed.

This bearing spindle 21 continues above the head 22 and is supported at its upper end in an anti-friction bearing 43, which is shown as a ball bearing seated on the shoulder 41 on said spindle and adapted to fit within the walls of the casing on its outer surface. The bearing has balls 42 and is placed at this particular location in order that it may assist the bearing 30 in absorbing any radial vibration. This bearing 42 is of any desired type and is adapted to be retained in position by means of a lock ring 45 and G-ring 46, which are similar to those which retain the bearing 30 in place. The bearing 42 is adapted to fit snugly with the cap member 3 so that by tightening down on the lock ring 44 the bearing spindle 21 will be retained in a firm position with respect to the housing. A packing ring 47 is shown at the top of the bearing spindle to prevent the entrance of flushing fluid past the threads 48 and to prevent the escape of lubricant from the cavity 49.

A central sleeve 50 is shown as screwed into the threads 48 and serves as a passage for the flushing fluid from the gooseneck 6. The gland 24 serves as a bearing or support for the lower end of this sleeve 50. It is obvious that the sleeve 50 does not rotate as it is fixed to the cap member 3, the spindle 21 rotating about the sleeve 50. I have shown a plug 52 as closing an opening whereby lubricating fluid may be passed into the central portion of the housing as all three of the bearings described are adapted to run in a bath of lubricant.

My improved swivel as herein disclosed I believe will present a structure which will give considerably greater length of service than swivels heretofore devised, as the radial bearings placed above and below the main thrust bearing permit the radial stresses to be absorbed, so that the thrust bearing is not subjected to any vibration. This is one of the material advantages of my construction and I have shown a combination thrust and radial bearing below and radial bearing above, but I do not desire to be limited to this precise arrangement as obviously other assemblies may be used without departing from the spirit of my invention. I do not desire to be limited to the precise type of bearing used at any one of the three locations as I intend that a bearing capable of carrying the loads for various sizes of swivels may be used.

Having described my invention, what I claim is new and desire to protect by Letters Patent is:

1. A swivel for well drilling including a casing, a rotatable spindle therein, a cross head on said spindle, a thrust bearing supporting said cross head, radial bearings above and below said cross head and means carried by said spindle to adjustably position said lower radial bearing with respect to said spindle.

2. An hydraulic swivel having a housing member, a means of suspension, a hose connection, a rotatable spindle, a main thrust bearing member, a radial shoulder on the said spindle resting on the said bearing member, an auxiliary combination radial and thrust bearing located below the main bearing, a means of adjustment for the said bearings, and a packing box on the lower end of said spindle below said bearings.

3. A rotary swivel of the character described including a rotatable spindle, a housing therefor, a connection for fluid on said housing leading to said spindle, a main thrust bearing, two sets of anti-friction radial bearings supporting said spindle in said housing, and means on said spindle to adjust the position of one of said radial bearings.

4. In a rotary hydraulic swivel, the combination of a body member, and a base member, a rotary stem mounted axially of the base member and the body member, a main supporting bearing mounted within the body member for rotatably supporting the rotary stem, a bearing sleeve adjustably secured to the rotary stem within the base member, and an up-thrust bearing mounted upon said bearing sleeve within the base member, and the body member.

5. An hydraulic swivel for well drilling including a three part casing, a goose-neck formed integral with the top part of said casing, a bail connection on said goose-neck, a drill stem supporting spindle in said casing, a main thrust bearing for said spindle in the middle part of said casing, a radial bearing for said spindle in the top part of said casing, and a lower combination radial and thrust bearing for said spindle in the base of the middle part of said casing, the bottom part of said casing tending to enclose said lower bearing.

6. In a rotary hydraulic swivel, the combination of a body member, a base member and a bonnet, a rotary stem mounted axially of the base member and the body member, a main supporting bearing mounted within the body member for rotatably supporting the rotary stem, a bearing sleeve adjustably secured to the rotary stem within the base member, an up-thrust bearing mounted upon said bearing sleeve within the body member, and an anti-friction radial bearing in said bonnet to align said stem.

7. In a rotary hydraulic swivel, the combination of a body member, a base member removably secured to the lower end of the body member, a detachable bonnet on the upper end of said body, a rotary stem, a main supporting bearing mounted within the body member for rotatably supporting the rotary stem, a bearing sleeve adjustably secured to the rotary stem within the body member, an up-thrust bearing ring mounted upon the upper end of the bearing sleeve, an up-thrust bearing supported by the up-thrust bearing ring, an upper bearing ring for the up-thrust bearing supported within the lower end of the body member, and a radial bearing supporting said stem in said bonnet.

WALTER E. KING.